(12) United States Patent
Bernat et al.

(10) Patent No.: US 11,444,846 B2
(45) Date of Patent: Sep. 13, 2022

(54) TECHNOLOGIES FOR ACCELERATED ORCHESTRATION AND ATTESTATION WITH EDGE DEVICE TRUST CHAINS

(71) Applicant: Intel Corporation, Santa Clara, CA (US)

(72) Inventors: Francesc Guim Bernat, Baecelona (ES); Kapil Sood, Portland, OR (US); Tarun Viswanathan, El Dorado Hills, CA (US); Kshitij Doshi, Tempe, AZ (US); Timothy Verrall, Pleasant Hill, CA (US); Ned M. Smith, Beaverton, OR (US); Manish Dave, Folsom, CA (US); Alex Vul, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/368,980

(22) Filed: Mar. 29, 2019

(65) Prior Publication Data
US 2019/0230002 A1    Jul. 25, 2019

(51) Int. Cl.
*H04L 41/00* (2022.01)
*H04L 9/40* (2022.01)
(Continued)

(52) U.S. Cl.
CPC .............. *H04L 41/20* (2013.01); *G06F 21/57* (2013.01); *H04L 41/0893* (2013.01); *H04L 41/5003* (2013.01); *H04L 63/0823* (2013.01)

(58) Field of Classification Search
CPC . H04L 41/20; H04L 41/0893; H04L 41/5003; H04L 63/0823; H04L 63/10;
(Continued)

(56) References Cited

U.S. PATENT DOCUMENTS 10,104,039 B1    10/2018 Knecht et al.
10,326,754 B2 *  6/2019 Newton .............. H04L 63/0823
(Continued)

FOREIGN PATENT DOCUMENTS

KR    102110273 B1 *   5/2020

OTHER PUBLICATIONS

European Patent Office "Communication under Rule 71(3) EPC" dated Feb. 25, 2022, for related EP application No. 20158073.5, 31 pages.

*Primary Examiner* — Tan Doan
(74) *Attorney, Agent, or Firm* — Hanley, Flight & Zimmerman, LLC

(57) ABSTRACT

Technologies for accelerated orchestration and attestation include multiple edge devices. An edge appliance device performs an attestation process with each of its components to generate component certificates. The edge appliance device generates an appliance certificate that is indicative of the component certificates and a current utilization of the edge appliance device and provides the appliance certificate to a relying party. The relying party may be an edge orchestrator device. The edge orchestrator device receives a workload scheduling request with a service level agreement requirement. The edge orchestrator device verifies the appliance certificate and determines whether the service level agreement requirement is satisfied based on the appliance certificate. If satisfied, the workload is scheduled to the edge appliance device. Attestation and generation of the appliance certificate by the edge appliance device may be performed by an accelerator of the edge appliance device. Other embodiments are described and claimed.

29 Claims, 5 Drawing Sheets

(51) Int. Cl.
*H04L 41/5003* (2022.01)
*H04L 41/0893* (2022.01)
*G06F 21/57* (2013.01)

(58) Field of Classification Search
CPC ............ H04L 63/0876; H04L 41/5009; H04L 41/5019; G06F 21/57
USPC ........................................................ 709/223
See application file for complete search history.

(56) References Cited

U.S. PATENT DOCUMENTS

| | | | |
|---|---|---|---|
| 2014/0082352 A1* | 3/2014 | Howry | G06F 21/57 713/157 |
| 2015/0058477 A1* | 2/2015 | Gould | H04L 67/1097 709/224 |
| 2016/0301532 A1* | 10/2016 | Lim | G06F 12/1408 |
| 2018/0183855 A1 | 6/2018 | Sabella et al. | |
| 2019/0042319 A1 | 2/2019 | Sood et al. | |
| 2019/0109877 A1* | 4/2019 | Samuel | G06F 21/44 |
| 2019/0140921 A1* | 5/2019 | Xu | H04W 28/26 |

* cited by examiner

TECHNOLOGIES FOR ACCELERATED ORCHESTRATION AND ATTESTATION WITH EDGE DEVICE TRUST CHAINS

BACKGROUND

Certain cloud computing architectures may provide function as a service (FaaS) services. Typical FaaS systems allow a client to invoke a particular function on-demand, without executing a dedicated service process. A FaaS function may be performed by an appliance composed of multiple components. The number or amount of users executing FaaS services may be unbounded.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
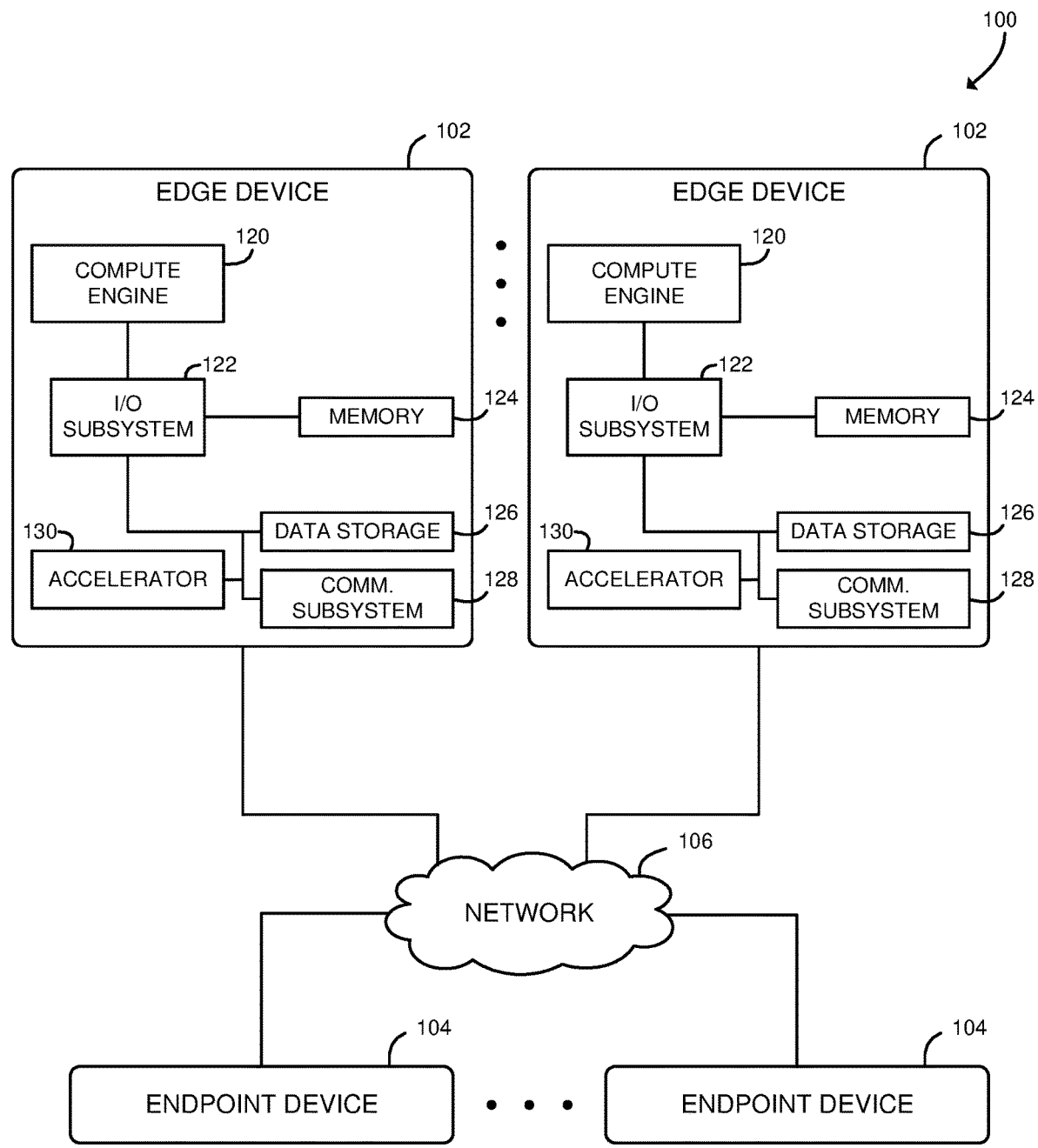
FIG. 1 is a simplified block diagram of at least one embodiment of a system for accelerated orchestration and attestation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for accelerated orchestration and attestation includes multiple edge devices 102 and multiple endpoint devices 104. In use, as described further below, one or more edge devices 102 may be composed into or otherwise establish an edge appliance device 102 to perform a function-as-a-service (FaaS) request or other service. The edge appliance device 102 generates an appliance certificate using accelerated logic. The appliance certificate attests to the configuration and utilization of one or more components of the edge appliance device 102. The edge appliance device 102 provides the appliance certificate to an orchestrator, such as an edge orchestrator device 102. The edge orchestrator device 102 verifies the appliance certificate and compares the appliance certificate to a service level agreement (SLA) requirement associated with a tenant workload. Thus, the system 100 allows for verification of the complete root of trust for components of an edge appliance, with low latency. Additionally, the system 100 allows for a workload plan to be verified before issuing an SLA, which extends the root of trust verification to extend into workload scheduling.

Each edge device 102 may be embodied as any type of device capable of performing the functions described herein. For example, the edge device 102 may be embodied as, without limitation, a computer, a server, a workstation, a multiprocessor system, a distributed computing device, a switch, a router, a network device, a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer), and/or a consumer electronic device. Additionally or alternatively, the edge device 102 may be embodied as a one or more compute sleds, memory sleds, or other racks, sleds, computing chassis, or other components of a physically disaggregated computing device. As shown in FIG. 1, the illustrative edge device 102 includes a compute engine 120, an I/O subsystem 122, a memory 124, a data storage device 126, and a communication subsystem 128. Additionally, in some embodiments, one or more of the illustrative components may be incorporated in, or otherwise form a portion of, another component. For example, the memory 124, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA), or other configurable circuitry, application-specific integrated circuit (ASIC), or other processor or processing/controlling circuit or virtualized version thereof. Similarly, the memory 124 may be embodied as any type of volatile or non-volatile memory or data storage capable of performing the functions described herein. In operation, the memory 124 may store various data and software used during operation of the edge device 102 such as operating systems, applications, programs, libraries, and drivers. As shown, the memory 124 may be communicatively coupled to the compute engine 120 via the I/O subsystem 122, which may be embodied as circuitry and/or components to facilitate input/output operations with the compute engine 120, the memory 124, and other components of the edge device 102. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the compute engine 120, for example via an integrated memory controller hub. Additionally, in some embodiments, the I/O subsystem 122 may form a portion of a system-on-a-chip (SoC) and be incorporated, along with the compute engine 120, the memory 124, the accelerator 130, and/or other components of the edge device 102, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The communications subsystem 128 may be embodied as any communication circuit, device, or collection thereof, capable of enabling communications between the edge device 102 and other remote devices over the network 106. The communications subsystem 128 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

The accelerator 130 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator 130 is an FPGA, which may be embodied as an integrated circuit including programmable digital logic resources that may be configured after manufacture. The FPGA may include, for example, a configurable array of logic blocks in communication over a configurable data interchange. The accelerator 130 may be coupled to the compute engine 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect. In some embodiments, the accelerator 130 may be incorporated in or otherwise coupled with one or more other components of the edge device 102, such as a network interface controller (NIC) of the communication subsystem 128.

Each endpoint device 104 may be embodied as any type of computation or computer device capable of performing the functions described herein, including, without limitation, a computer, a mobile computing device, a wearable computing device, a network appliance, a web appliance, a distributed computing system, an autonomous vehicle, an autonomous aerial vehicle, an Internet of Things (IoT) sensor, an IoT gateway, an industrial automation device, a processor-based system, and/or a consumer electronic device. As such, each endpoint device 104 may include components and features similar to the edge device 102, such as a compute engine 120, I/O subsystem 122, memory 124, data storage 126, communication subsystem 128, and/or various peripheral devices. Those individual components of each endpoint device 104 may be similar to the corresponding components of the edge device 102, the description of which is applicable to the corresponding components of the endpoint device 104 and is not repeated for clarity of the present description.

As discussed in more detail below, the edge devices 102 and the endpoint devices 104 may be configured to transmit and receive data with each other and/or other devices of the system 100 over the network 106. The network 106 may be embodied as any number of various wired and/or wireless networks, or hybrids or combinations thereof. For example, the network 106 may be embodied as, or otherwise include a mobile access network, a network edge infrastructure, a wired or wireless local area network (LAN), and/or a wired or wireless wide area network (WAN). As such, the network 106 may include any number of additional devices, such as additional base stations, access points, computers, routers, and switches, to facilitate communications among the devices of the system 100. In the illustrative embodiment, the network 106 is embodied as an edge network fabric.

Figure 2:
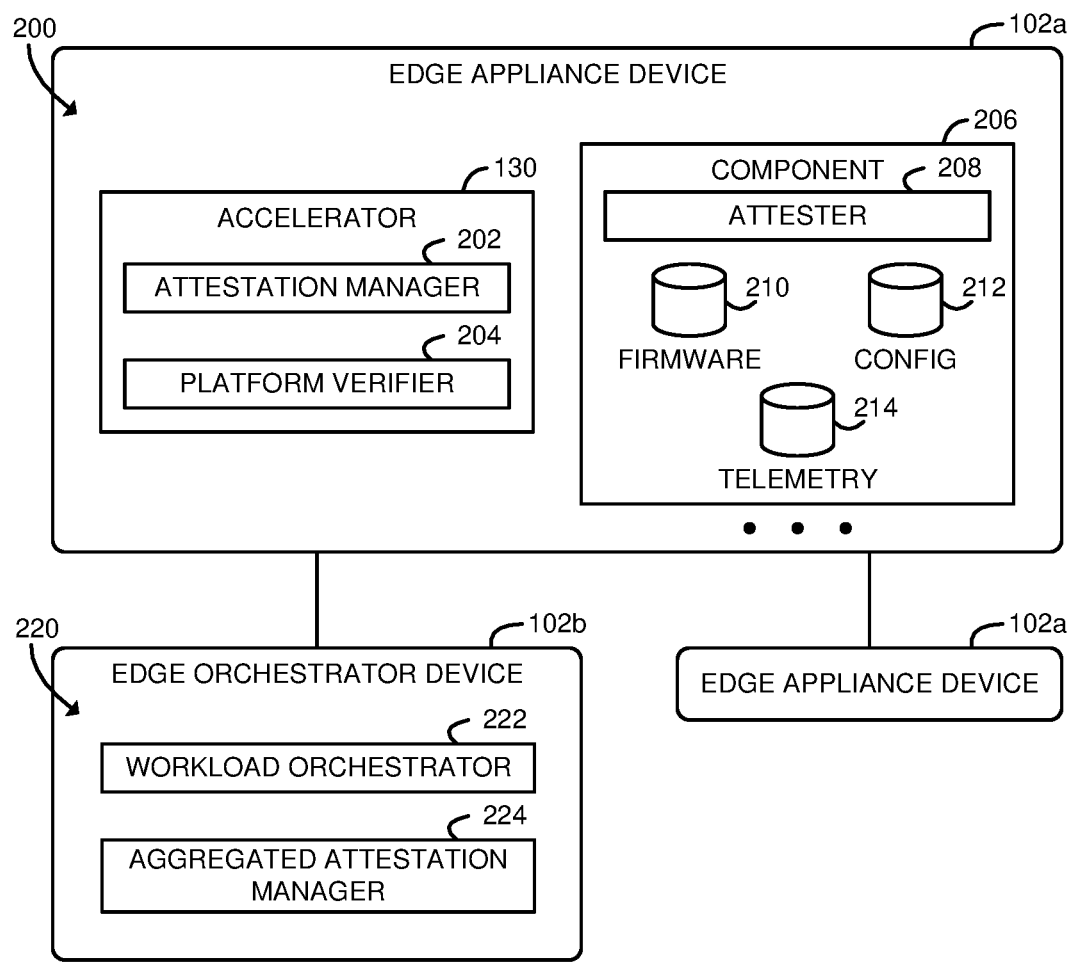
FIG. 2 is a simplified block diagram of at least one embodiment of various environments of the system of FIG. 1.

Referring now to FIG. 2, in an illustrative embodiment, each edge appliance device 102a establishes an environment 200 during operation. The illustrative environment 200 includes the accelerator 130 and one or more components 206. The accelerator 130 includes an attestation manager 202 and a platform verifier 204. Each component 206 includes an attester 208. The various components of the environment 200 may be embodied as hardware, firmware, software, or a combination thereof. As such, in some embodiments, one or more of the components of the environment 200 may be embodied as circuitry or collection of electrical devices (e.g., attestation manager circuitry 202, platform verifier circuitry 204, and/or component circuitry 206). It should be appreciated that, in such embodiments, one or more of the attestation manager circuitry 202, the platform verifier circuitry 204, and/or the component circuitry 206 may form a portion of the compute engine 120, the I/O subsystem 122, the memory 124, the data storage device 126, the accelerator 130, and/or other components of the edge device 102. Additionally, in some embodiments, one or more of the illustrative components may form a portion of another component and/or one or more of the illustrative components may be independent of one another.

The attestation manager 202 is configured to identify the components 206 included in the edge appliance device 102a. The attestation manager 202 is further configured to perform an attestation process with each component 206 of the edge appliance device 102a. The attestation process generates a component certificate for each component 206. The component certificate is indicative of firmware 210 of the component 206 and/or a hardware or firmware configuration 212 of the component 206. The attestation manager 202 is further configured to receive certified telemetry 214 from each component 206. The certified telemetry 214 is indicative of current utilization of that component 206.

The platform verifier 204 is configured to generate an appliance certificate. The appliance certificate is indicative of the aggregated component certificate of the components 206 and a current utilization of the edge appliance device 102a. The platform verifier 204 is further configured to provide the appliance certificate to a relying party. For example, the relying party may be a remote edge orchestrator device 102b or a platform active root of trust (e.g., accelerator 130). For example, the platform active root of trust may be the platform verifier 204 where the platform verifier 204 is implemented in an accelerator 130 such as an FPGA.

Each component 206 may be embodied as a compute engine 120 or other compute platform (e.g., processor, SoC, or other compute element and motherboard or other associated circuit board), a memory device 124 (e.g., a DIMM or other memory component), data storage device 126, an accelerator 130, a functional block, an IP block, or another component of the edge appliance device 102. In some embodiments, the components 206 may include one or more disaggregated components, such as memory sleds, storage sleds, compute sleds, accelerator sleds, or other rack-scale design disaggregated components. The component 206 includes an attester 208 that is configured to perform an attestation procedure including generating a component certificate for the component 206. The component certificate is indicative of firmware 210, a hardware or firmware configuration 212, and/or certified telemetry 214 of the component. For example, the component certificate may include or be based on a hash value indicative of the firmware 210 and/or the configuration 212. The configuration 212 may be indicative of hardware features, firmware features, or other configuration of the component 206. For example, the component certificate may be indicative of a trusted execution environment provided by the component 206, including one or more security properties of the trusted execution environment.

Still referring to FIG. 2, in the illustrative embodiment, an edge orchestrator device 102b establishes an environment 220 during operation. The illustrative environment 220 includes a workload orchestrator 222 and an aggregated attestation manager 224. The various components of the environment 220 may be embodied as hardware, firmware, software, or a combination thereof. As such, in some embodiments, one or more of the components of the environment 220 may be embodied as circuitry or collection of electrical devices (e.g., workload orchestrator circuitry 222 and/or aggregated attestation manager circuitry 224). It should be appreciated that, in such embodiments, one or more of the workload orchestrator circuitry 222 and/or the aggregated attestation manager circuitry 224 may form a portion of the compute engine 120, the I/O subsystem 122, the accelerator 130, and/or other components of the edge device 102. Additionally, in some embodiments, one or more of the illustrative components may form a portion of another component and/or one or more of the illustrative components may be independent of one another.

The aggregated attestation manager 224 is configured to receive an appliance certificate from an edge appliance device 102a. As described above, the appliance certificate is indicative of an aggregate component certificate and a current utilization of the edge appliance device 102a. The aggregate component certificate is indicative of a configuration of each component 206 of the edge appliance device 102a, including the firmware 210 and/or the configuration 210. The aggregated attestation manager 224 is further configured to verify the appliance certificate. Verifying the appliance certificate may include comparing the appliance certificate to an expected certificate that is indicative of an expected configuration 210 of each component 206 the edge appliance device 102a.

The workload orchestrator 222 is configured to receive a workload scheduling request indicative of a service level agreement (SLA) requirement associated with a workload. The workload orchestrator 222 is further configured to determine whether the edge appliance device 102a satisfies the SLA requirement based on the appliance certificate, and, if so, to schedule the workload to the edge appliance device 102a. For example, the workload orchestrator 222 may evaluate a security property of a trusted execution environment provided by the component 206 to determine whether the edge appliance device 102a satisfies the SLA requirement.

Additionally or alternatively, in some embodiments the aggregated attestation manager 224 may be configured to perform similar functions as the attestation manager 202 and/or the platform verifier 204, whereby attestations between edge appliance devices 102 is managed (similarly to attestations between components 206 at the device level). In those embodiments, the attestation manager 202 of the edge appliance device 102 may appear to the aggregated attestation manager 224 as though the attestation manager 202 were an attester 208. In those embodiments, each attestation manager 202 may forward attestations originating from an attester 208 or each attestation manager 202 may aggregate the attestations into a simplified attestation statement that speaks on behalf of the platform verification result (e.g., from the platform verifier 204).

Figure 3:
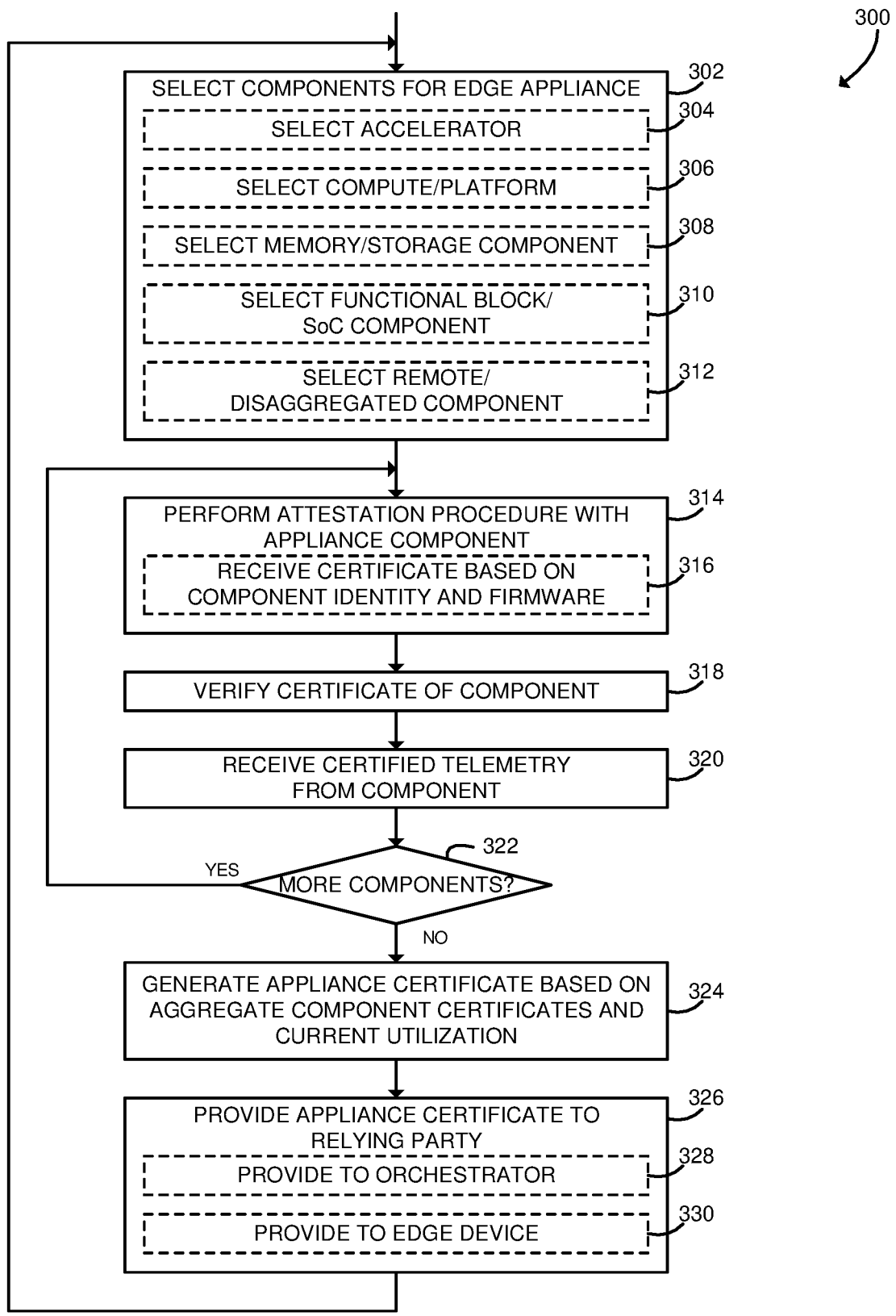
FIG. 3 is a simplified flow diagram of at least one embodiment of a method for aggregated attestation that may be executed by an edge appliance device of the system of FIGS. 1-2.

Referring now to FIG. 3, in use, the edge appliance device 102a may execute a method 300 for aggregated attestation. It should be appreciated that, in some embodiments, the operations of the method 300 may be performed by one or more components of the environment 200 of the edge appliance device 102a as shown in FIG. 2, such as the accelerator 130. The method 300 begins in block 302, in which the edge appliance device 102a identifies or otherwise selects the components 206 included in the edge appliance device 102a. In some embodiments, in block 304, the edge appliance device 102b may select one or more accelerators 130. In some embodiments, in block 306 the edge appliance device 102b may select one or more compute platforms. Each compute platform may include a compute engine 120 and an associated motherboard or other supporting circuitry. In some embodiments, in block 308 the edge appliance device 102b may select one or more memory or storage components. For example, the edge appliance device 102b may select one or more memory DIMMs, nonvolatile flash memory chips, SSDs, 3D XPoint memory DIMMs, or other volatile or nonvolatile memory or storage components. In some embodiments, in block 310 the edge appliance device 102b may select one or more functional blocks, IP blocks, or other sub-components of an SoC or other computer chip. In some embodiments, in block 312 the edge appliance device 102b may select one or more remote and/or disaggregated components 206. For example, the edge appliance device 102b may identify one or more remote edge devices 102, such as memory sleds, storage sleds, compute sleds, accelerator sleds, or other racks or rack-scale design disaggregated components.

In block 314, the edge appliance device 102a performs an attestation procedure with a component 206 of the edge appliance device 102a. During the attestation procedure, in block 316 the edge appliance device 102a receives a component certificate from the component 206. The component certificate includes a verifiable assertion of the identity and configuration of the component 206. Thus, the component certificate may be indicative of the firmware 210 version of the component 206, particular hardware or firmware features of the component 206, or other attributes of the component 206. For example, the component certificate may be indicative of particular security attributes of a trusted execution environment provided by the edge appliance device 102a. The security attributes may indicate cryptographic or isolation protections available to code or data processed by the edge appliance device 102a, such as secret keys or other sensitive data.

The edge appliance device 102a and the component 206 may perform any appropriate attestation protocol. For example, in some embodiments, the component 206 may perform Implicit Identity Based Device Attestation as published by the Trusted Computing Group (TCG). In those embodiments, the attester 208 of the component 206 may be embodied as or otherwise include a trusted Device Identifier Composition Engine (DICE). The DICE measures a first mutable code of the component 206 (e.g., part or all of the firmware 210) and securely combines the measurement with a unique device secret (e.g., using a hash or one-way function) to generate a compound device identifier (CDI). The component 206 derives an asymmetric key pair based on the CDI that is used as a device identity for the component 206, and generates a certificate based on that key pair. In some embodiments, the component 206 may derive an alias key based on the firmware 210 (e.g., based on updatable firmware 210) and use the device identifier to generate an alias certificate. Thus, the device certificate and the alias certificate are indicative of the identity of the component 206 (e.g., a unique device secret) and the configuration of component 206 (e.g., the contents of part or all of the firmware 210). Accordingly, the device certificate and/or the alias certificate may be used as the component certificate for the component 206.

In block 318, the edge appliance device 102a may verify the component certificate of the component 206. The edge appliance device 102a may verify the certificate using any appropriate verification technique. For example, for Implicit Identity Based Device Attestation, the edge appliance device 102a may verify the certificate using the public key of the Device Identifier of the component 206. The public key may be provided by the component 206, and in some embodiments the public key may be certified by a trusted party such as a manufacturer, vendor, or other entity associated with the component 206. If the certificate is not successfully verified, the edge appliance device 102a may generate an error or otherwise indicate that the verification was not successful. Upon successful verification, the method 300 proceeds to block 320.

In block 320, the edge appliance device 102a may receive certified telemetry 214 from the component 206. The certified telemetry 214 is indicative of utilization of the component 206. For example, the telemetry 214 may indicate processor utilization of a compute engine 120, memory or storage utilization, or other utilization statistics. The telemetry 214 may be certified by the component 206, for example by being signed with the device identifier, alias identifier, or other key of the component 206. The edge appliance device 102a may verify the certified telemetry 214, for example using the device certificate.

In block 322, the edge appliance device 102a determines whether additional components 206 remain for attestation. If so, the method 300 loops back to block 314 to continue performing attestation for the remaining components 206. If no additional components remain, the method 300 advances to block 324.

In block 324, the edge appliance device 102a generates an appliance certificate. The appliance certificate is based on an aggregate certificate of all of the component certificates and the current utilization of the edge appliance device 102a. For example, the edge appliance device 102a may concatenate the certificates of all the components 206 along with the current utilization, and then generate the appliance certificate over that concatenation.

In block 326, the edge appliance device 102a provides the appliance certificate to a relying party. In some embodiments, in block 328 the edge appliance device 102a may provide the appliance certificate to a remote edge orchestrator device 102b. In some embodiments, in block 330 the edge appliance device 102b may provide the appliance certificate to another edge device 102. For example, the appliance certificate may be provided to a platform active root of trust (e.g., an accelerator 130) of another edge device 102. Thus, the system 100 may perform nested, aggregated attestation. After providing the appliance attestation, the method 300 loops back to block 302 to continue performing attestation.

Figure 4:
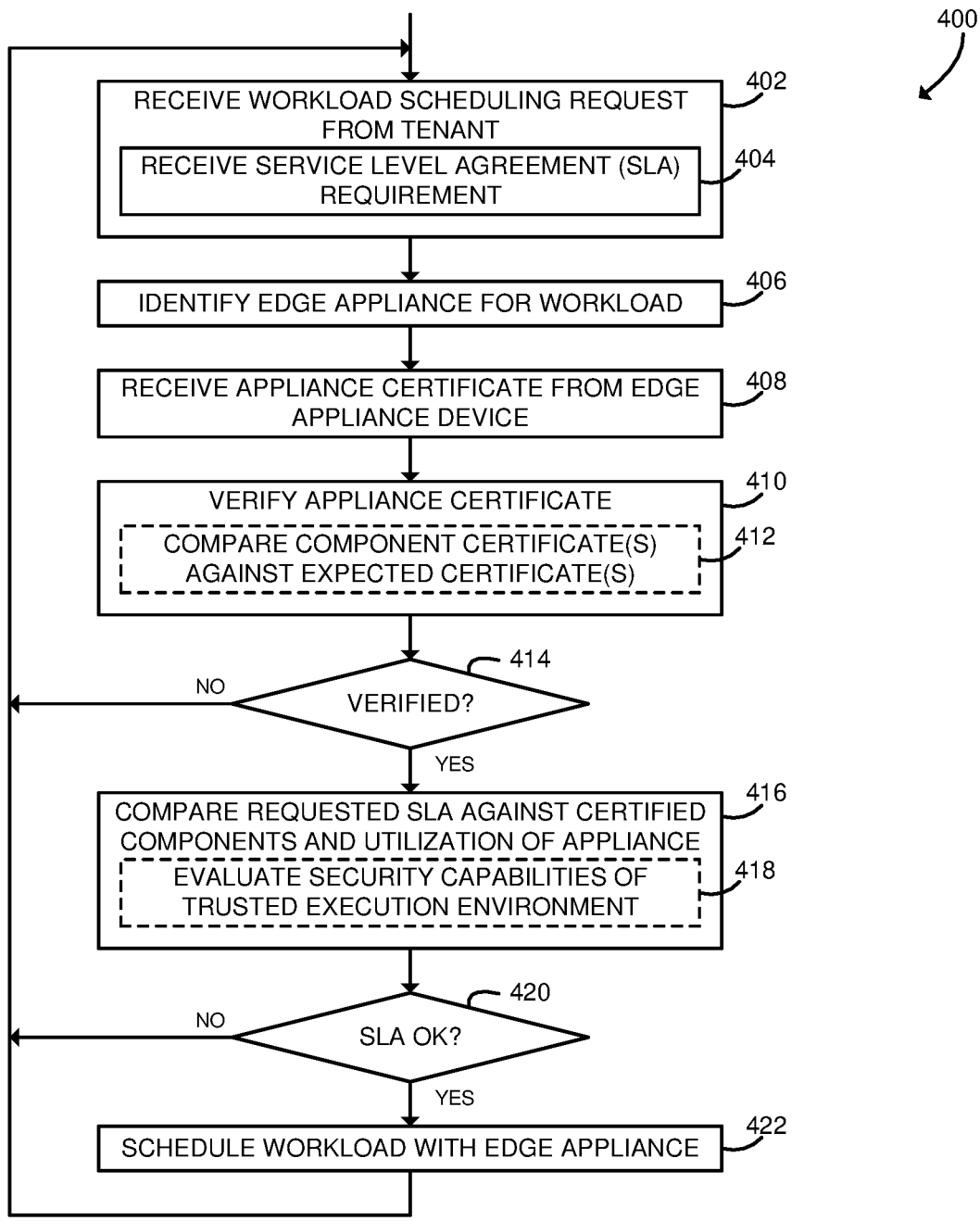
FIG. 4 is a simplified flow diagram of at least one embodiment of a method for attestation and orchestration that may be executed by an edge orchestrator device of the system of FIGS. 1-2.

Referring now to FIG. 4, in use, the edge orchestrator device 102b may execute a method 400 for attestation and orchestration. It should be appreciated that, in some embodiments, the operations of the method 400 may be performed by one or more components of the environment 220 of the edge orchestrator device 102b as shown in FIG. 2. The method 400 begins in block 402, in which the edge orchestrator device 102b receives a workload scheduling request from a tenant. The request may identify one or more virtual machines, function as a service (FaaS) instances, or other workloads to be executed by an edge appliance device 102a. In block 404, the edge orchestrator device 102b receives a service level agreement (SLA) requirement for the workload request. The SLA requirement may identify one or more processing capacity, latency, storage, or other requirements associated with the workload.

In block 406, the edge orchestrator device 102b identifies the edge appliance device 102a to execute the workload. For example, the edge orchestrator device 102b may select the edge appliance device 102a from a pool of available edge devices 102. In some embodiments, the edge orchestrator device 102b may compose the edge appliance device 102a from multiple disaggregated components. For example, the edge orchestrator device 102b may compose the edge appliance device 102a from multiple compute sleds, accelerator sleds, memory sleds, storage sleds, and/or other edge devices 102.

In block 408, the edge orchestrator device 102b receives an appliance certificate from the edge appliance device 102a. As described above, the appliance certificate is indicative of an aggregated component certificate for the components 206 of the edge appliance device 102a and the current utilization of the edge appliance device 102a.

In block 410 the edge orchestrator device 102b verifies the appliance certificate. The edge orchestrator device 102b may verify the component certificate for each component 206 of the edge appliance device 102a, as well as the utilization information of the appliance certificate. In block 412, the edge orchestrator device 102b may compare each component certificate against a corresponding expected certificate. The expected certificate may be associated with, for example, an expected identity or expected firmware 210 version for each particular component 206 of the edge appliance device 102a. In block 414, the edge orchestrator device 102b checks whether the appliance certificate was verified. If not, the method 400 loops back to block 402 to process additional workload requests. The edge orchestrator device 102b may indicate an error or otherwise indicate that the appliance certificate was not verified. Referring back to block 414, if the appliance certificate is successfully verified, the method 400 advances to block 416.

In block 416, the edge orchestrator device 102b compares the SLA requirement to the certified components 206 and utilization of the edge appliance device 102a. For example, the edge orchestrator 102b may determine whether the components 206 of the edge appliance device 102a provide features or particular components requested by the SLA requirement. As another example, the edge orchestrator 102b may determine whether the edge appliance device 102a is capable of meeting performance or latency standards requested by the SLA requirement, based on the current utilization of the edge appliance device 102a. In some embodiments, in block 418 the edge orchestrator device 102b may evaluate one or more security capabilities of a trusted execution environment provided by the edge appliance device 102a. For example, a compute engine 120 may provide a trusted execution environment such as an Intel® SGX secure enclave. The appliance certificate may indicate cryptographic or other isolation protections provided by the trusted execution environment to code, keys, or other sensitive data.

In block 420, the edge orchestrator device 102b determines whether the edge appliance device 102a satisfies the SLA requirement. If not, the method 400 loops back to block 402 to process additional workload requests. In some embodiments, the edge orchestrator device 102b may indicate an error or otherwise indicate that the SLA requirement cannot be satisfied. Additionally or alternatively, in some embodiments the edge orchestrator device 102b may suggest a reduced SLA based on the capabilities indicated in the appliance certificate. Referring back to block 420, if the SLA requirements can be satisfied, the method 400 branches to block 422, in which the edge orchestrator 102b schedules the workload with the edge appliance device 102a. The edge appliance device 102a executes the workload using the components 206. For example, the workload may be executed within a trusted execution environment with protections indicated by the application certificate as described above. After scheduling the workload, the method 400 loops back to block 402 to continue processing workload scheduling requests.

Figure 5:
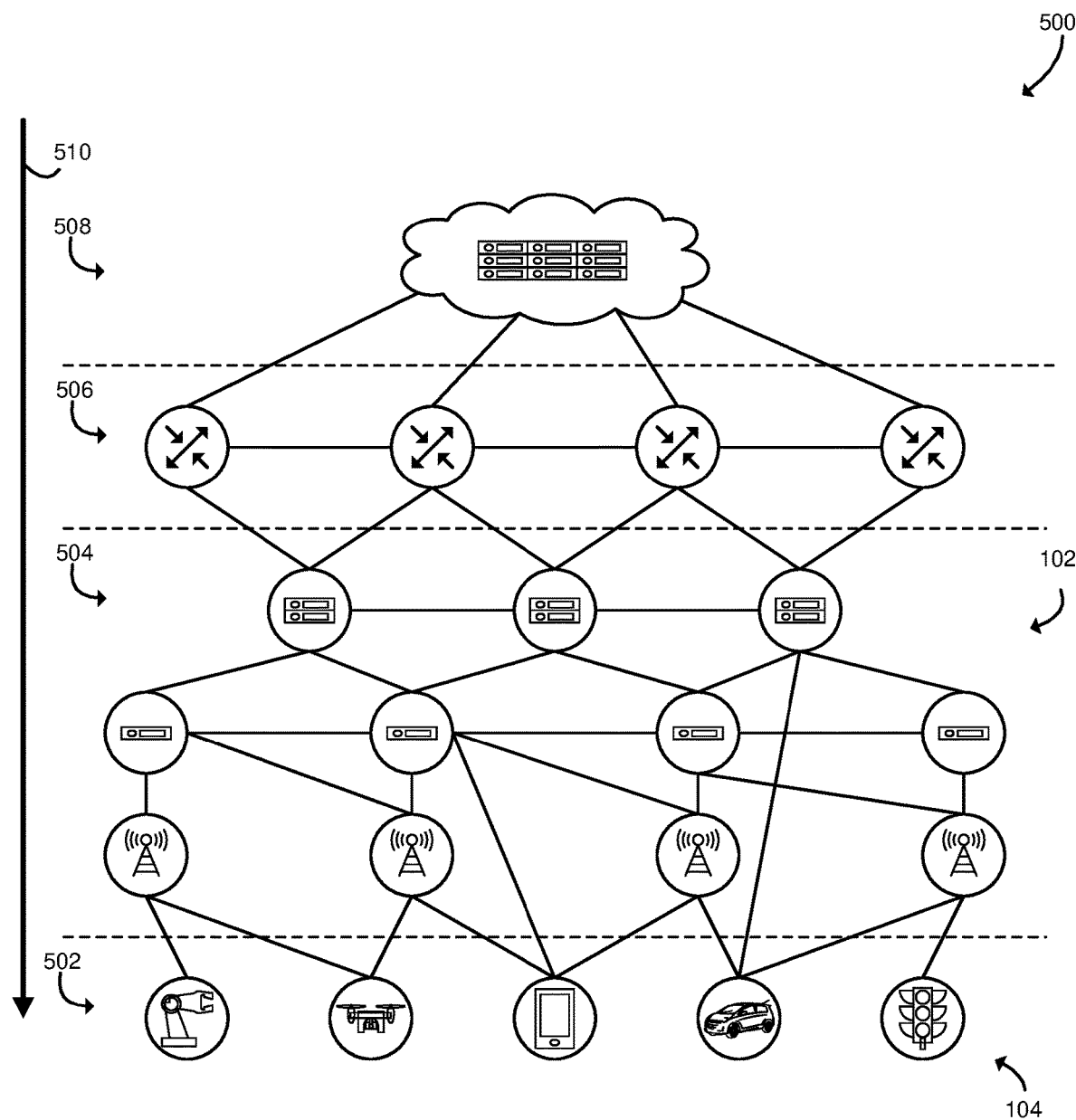
FIG. 5 is a simplified block diagram of at least one embodiment of an edge architecture that may include the system of FIGS. 1-2.

Referring now to FIG. 5, diagram 500 shows an edge architecture that may include the system 100. As shown, the edge architecture includes multiple tiers 502, 504, 506, 508. Each tier includes multiple nodes that may communicate via an edge fabric to other nodes of the same tier and/or nodes at other tiers. As shown, the endpoint devices 104 may be included in the things/endpoint tier 502. The things/endpoint tier 502 may include large numbers of endpoint devices 104 that are heterogeneous, may be mobile, and are widely distributed geographically. The access/edge tier 504 may include access network components such as wireless towers, access points, base stations, intermediate nodes, gateways, fog nodes, central offices, and other access network or edge components. Components of the access/edge tier 504 may be distributed at the building, small cell, neighborhood, or cell scale. Thus, components of the access/edge tier 504 may be relatively close in physical proximity to components of the things/endpoint tier 502. The core network tier 506 may include core network routers, network gateways, servers, and other more-centralized computing devices. Components of the core network tier 506 may be distributed regionally or nationally. The cloud/Internet tier 508 may include Internet backbone routers, cloud service providers, datacenters, and other cloud resources. The components of the cloud/Internet tier 508 may be distributed globally. As shown, the edge devices 102 (e.g., the edge appliance devices 102a and/or the edge orchestrator devices 102b) may be included in all of the access/edge tier 504, the core network tier 506, and/or the cloud/Internet tier 508.

As shown, the edge architecture is organized according to a logical gradient 510 from global, cloud-based components toward local, endpoint devices. Components that are closer to the network edge (i.e., closer to the endpoint tier 502) may be smaller but more numerous, with fewer processing resources and lower power consumption, as compared to components that are closer to the network core (i.e., closer to the cloud/Internet tier 508). However, network communications among components closer to the network edge may be faster and/or have lower latency as compared to communications that traverse through tiers closer to the network core. The same logical gradient 510 may apply to components within a tier. For example, the access/edge tier 504 may include numerous, widely spread base stations, street cabinets, and other access nodes as well as less-numerous but more sophisticated central offices or other aggregation nodes. Thus, by including key caching functionality in the access/edge tier 504 or other components close to the network edge (e.g., logically close to the endpoint devices 104), the system 100 may improve latency and performance as compared to traditional cloud-computing based FaaS architectures.

In addition to the mobile edge computing implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

It should be appreciated that, in some embodiments, the methods 300 and/or 400 may be embodied as various instructions stored on a computer-readable media, which may be executed by the compute engine 120, the I/O subsystem 122, the accelerator 130, and/or other components of the edge device 102 to cause the edge device 102 to perform the respective method 300 and/or 400. The computer-readable media may be embodied as any type of media capable of being read by the edge device 102 including, but not limited to, the memory 124, the data storage device 126, firmware devices, other memory or data storage devices of the edge device 102, portable media readable by a peripheral device of the edge device 102, and/or other media.

EXAMPLES

Illustrative examples of the technologies disclosed herein are provided below. An embodiment of the technologies may include any one or more, and any combination of, the examples described below.

Example 1 includes an edge appliance device for appliance attestation, the edge appliance device comprising an attestation manager to perform an attestation process with a component of the edge appliance device to generate a component certificate; and a platform verifier to (i) generate an appliance certificate, wherein the appliance certificate is indicative of the component certificate and current utilization of the edge appliance device, and (ii) provide the appliance certificate to a relying party.

Example 2 includes the subject matter of Example 1, and wherein the edge appliance device comprises an accelerator, and wherein the accelerator comprises the attestation manager and the platform verifier.

Example 3 includes the subject matter of any of Examples 1 and 2, and wherein the platform verifier is further to receive certified telemetry from the component, wherein the certified telemetry is indicative of current utilization of the component; and to generate the appliance certificate comprises to generate the appliance certificate based on the current utilization of the component.

Example 4 includes the subject matter of any of Examples 1-3, and wherein the component comprises an accelerator, a compute platform, a memory component, a storage component, or a functional block of the edge appliance device.

Example 5 includes the subject matter of any of Examples 1-4, and wherein the component comprises a disaggregated resource of the edge appliance device.

Example 6 includes the subject matter of any of Examples 1-5, and wherein the attestation manager is further to (i) identify a plurality of components of the edge appliance device, wherein the plurality of components comprises the component, and (ii) perform, for each component of the plurality of components, an attestation process to generate a component certificate for each component of the plurality of components; and the appliance certificate is indicative of the component certificate of each component of the plurality of components.

Example 7 includes the subject matter of any of Examples 1-6, and wherein to perform the attestation process comprises to receive a component certificate indicative of a trusted execution environment provided by the component.

Example 8 includes the subject matter of any of Examples 1-7, and wherein the component certificate is indicative of a security property of the trusted execution environment.

Example 9 includes the subject matter of any of Examples 1-8, and wherein to perform the attestation process comprises to securely receive a component certificate indicative of a hardware configuration and a firmware configuration of the component.

Example 10 includes the subject matter of any of Examples 1-9, and wherein the component certificate comprises a hash value indicative of the hardware configuration and the firmware configuration of the component.

Example 11 includes the subject matter of any of Examples 1-10, and wherein to provide the appliance certificate to the relying party comprises to provide the appliance certificate to a remote orchestrator device.

Example 12 includes the subject matter of any of Examples 1-11, and wherein to provide the appliance certificate to the relying party comprises to provide the appliance certificate to a platform active root of trust.

Example 13 includes a computing device for appliance orchestration, the computing device comprising a workload orchestrator to receive a workload scheduling request, wherein the workload scheduling request is indicative of a service level agreement requirement associated with a workload; and an aggregated attestation manager to receive an appliance certificate from an edge appliance device, wherein the appliance certificate is indicative of an aggregate component certificate and a current utilization of the edge appliance device, wherein the aggregate component certificate is indicative of a configuration of each component of a plurality of components of the edge appliance device; wherein the workload orchestrator is further to (i) determine whether the edge appliance device satisfies the service level agreement requirement based on the appliance certificate, and (ii) schedule the workload to the edge appliance device in response to a determination that the edge appliance device satisfies the service level agreement requirement.

Example 14 includes the subject matter of Example 13, and wherein the aggregated attestation manager is further to verify the appliance certificate in response to receipt of the appliance certificate; wherein to schedule the workload further comprises to schedule the workload in response to verification of the appliance certificate.

Example 15 includes the subject matter of any of Examples 13 and 14, and wherein to verify the appliance certificate comprises to compare the appliance certificate to an expected certificate, wherein the expected certificate is indicative of an expected configuration of each component of the plurality of components of the edge appliance device.

Example 16 includes the subject matter of any of Examples 13-15, and wherein the appliance certificate is indicative of trusted execution environment provided by the edge appliance device.

Example 17 includes the subject matter of any of Examples 13-16, and wherein to determine whether the edge appliance device satisfies the service level agreement requirement comprises to evaluate a security property of the trusted execution environment.

Example 18 includes a method for appliance attestation, the method comprising performing, by an edge appliance device, an attestation process with a component of the edge appliance device to generate a component certificate; generating, by the edge appliance device, an appliance certificate, wherein the appliance certificate is indicative of the component certificate and current utilization of the edge appliance device; and providing, by the edge appliance device, the appliance certificate to a relying party.

Example 19 includes the subject matter of Example 18, and wherein performing the attestation process comprises performing the attestation process by an accelerator of the edge appliance device; generating the appliance certificate comprises generating the appliance certificate by the accelerator; and providing the appliance certificate comprises providing the appliance certificate by the accelerator.

Example 20 includes the subject matter of any of Examples 18 and 19, and further including receiving, by the edge appliance device, certified telemetry from the component, wherein the certified telemetry is indicative of current utilization of the component; wherein generating the appliance certificate comprises generating the appliance certificate based on the current utilization of the component.

Example 21 includes the subject matter of any of Examples 18-20, and wherein the component comprises an accelerator, a compute platform, a memory component, a storage component, or a functional block of the edge appliance device.

Example 22 includes the subject matter of any of Examples 18-21, and wherein the component comprises a disaggregated resource of the edge appliance device.

Example 23 includes the subject matter of any of Examples 18-22, and further including identifying, by the edge appliance device, a plurality of components of the edge appliance device, wherein the plurality of components comprises the component; and performing, by the edge appliance device, for each component of the plurality of components, an attestation process to generate a component certificate for each component of the plurality of components; wherein the appliance certificate is indicative of the component certificate of each component of the plurality of components.

Example 24 includes the subject matter of any of Examples 18-23, and wherein performing the attestation process comprises receiving a component certificate indicative of a trusted execution environment provided by the component.

Example 25 includes the subject matter of any of Examples 18-24, and wherein the component certificate is indicative of a security property of the trusted execution environment.

Example 26 includes the subject matter of any of Examples 18-25, and wherein performing the attestation process comprises securely receiving a component certificate indicative of a hardware configuration and a firmware configuration of the component.

Example 27 includes the subject matter of any of Examples 18-26, and wherein the component certificate comprises a hash value indicative of the hardware configuration and the firmware configuration of the component.

Example 28 includes the subject matter of any of Examples 18-27, and wherein providing the appliance certificate to the relying party comprises providing the appliance certificate to a remote orchestrator device.

Example 29 includes the subject matter of any of Examples 18-28, and wherein providing the appliance certificate to the relying party comprises providing the appliance certificate to a platform active root of trust.

Example 30 includes a method for appliance orchestration, the method comprising receiving, by a computing device, a workload scheduling request, wherein the workload scheduling request is indicative of a service level agreement requirement associated with a workload; receiving, by the computing device, an appliance certificate from an edge appliance device, wherein the appliance certificate is indicative of an aggregate component certificate and a current utilization of the edge appliance device, wherein the aggregate component certificate is indicative of a configuration of each component of a plurality of components of the edge appliance device; determining, by the computing device, whether the edge appliance device satisfies the service level agreement requirement based on the appliance certificate; and scheduling, by the computing device, the workload to the edge appliance device in response to determining that the edge appliance device satisfies the service level agreement requirement.

Example 31 includes the subject matter of Example 30, and further including verifying, by the computing device, the appliance certificate in response to receiving the appliance certificate; wherein scheduling the workload further comprises scheduling the workload in response to verifying the appliance certificate.

Example 32 includes the subject matter of any of Examples 30 and 31, and wherein verifying the appliance certificate comprises comparing the appliance certificate to an expected certificate, wherein the expected certificate is indicative of an expected configuration of each component of the plurality of components of the edge appliance device.

Example 33 includes the subject matter of any of Examples 30-32, and wherein the appliance certificate is indicative of trusted execution environment provided by the edge appliance device.

Example 34 includes the subject matter of any of Examples 30-33, and wherein determining whether the edge appliance device satisfies the service level agreement requirement comprises evaluating a security property of the trusted execution environment.

Example 35 includes a computing device comprising a processor; and a memory having stored therein a plurality of instructions that when executed by the processor cause the computing device to perform the method of any of Examples 18-34.

Example 36 includes one or more non-transitory, computer readable storage media comprising a plurality of instructions stored thereon that in response to being executed result in a computing device performing the method of any of Examples 18-34.

Example 37 includes a computing device comprising means for performing the method of any of Examples 18-34.

The invention claimed is:

1. An edge appliance device to perform a workload, the edge appliance device comprising:
an attestation manager to obtain respective component certificates and respective telemetry data from respective ones of a plurality of components of the edge appliance device, the respective component certificates provided by the respective ones of the components to attest to respective configurations and respective identities of the respective ones of the components, the respective telemetry data including first telemetry data provided by a first one of the components to indicate utilization of the first one of the components, and second telemetry data provided by a second one of the components to indicate utilization of the second one of the components; and a platform verifier to: (i) concatenate the respective component certificates and the respective telemetry data provided by the respective ones of the components, and (ii) generate an appliance certificate over the concatenation, the appliance certificate to attest to the configurations and utilizations of the components of the edge appliance device, and the appliance certificate to be used to determine the workload is to be assigned to the edge appliance device.

2. The edge appliance device of claim 1, wherein the attestation manager and the platform verifier are implemented with at least one accelerator.

3. The edge appliance device of claim 1, wherein the first telemetry data is certified by the first one of the components based on a first key associated with the first one of the components, and the second telemetry data is certified by the second one of the components based on a second key associated with the second one of the components.

4. The edge appliance device of claim 1, wherein at least one of the components includes at least one of an accelerator, a compute platform, a memory component, a storage component, or a functional block of the edge appliance device.

5. The edge appliance device of claim 1, wherein at least one of the components is a disaggregated resource of the edge appliance device.

6. The edge appliance device of claim 1, wherein at least one of the respective component certificates is to indicate a respective trusted execution environment, the respective trusted execution environment associated with the respective component.

7. The edge appliance device of claim 6, wherein the at least one of the respective component certificates is to indicate a security property of the respective trusted execution environment.

8. The edge appliance device of claim 1, wherein at least one of the respective component certificates is to indicate a hardware configuration and a firmware configuration of the respective one of the components.

9. The edge appliance device of claim 8, wherein the at least one of the respective component certificates includes a hash value indicative of the hardware configuration and the firmware configuration of the respective one of the components.

10. The edge appliance device of claim 1, wherein the workload is a first workload, the platform verifier is to provide the appliance certificate to a remote orchestrator device, and the remote orchestrator device is to orchestrate performance of a plurality of workloads, including the first workload.

11. The edge appliance device of claim 1, wherein the platform verifier is to provide the appliance certificate to a platform active root of trust.

12. The edge appliance device of claim 1, wherein the attestation manager is to select the respective components of the edge appliance device for which an attestation process is to be performed, at least some of the respective components being disaggregated components, and at least some of the disaggregated components being remote from other components of the edge appliance device.

13. The edge appliance device of claim 1, wherein the attestation manager is to store the respective component certificates in at least one storage device for access by the platform verifier, and the platform verifier is to store the appliance certificate in the at least one storage device for access by a relying party.

14. The edge appliance device of claim 1, wherein the attestation manager is to:

obtain new respective component certificates and new respective telemetry data from the respective ones of the components of the edge appliance device; and the platform verifier is to generate a new appliance certificate based on the new respective component certificates and the new respective telemetry data obtained from the respective ones of the components of the edge appliance device.

15. One or more computer-readable storage devices comprising instructions that, when executed, cause one or more processors of an edge appliance device to at least:

identify components included in the edge appliance device;

obtain respective component certificates and respective telemetry data from respective ones of the components, the respective component certificates provided by the respective ones of the components to attest to respective configurations and respective identities of the respective ones of the components, the respective telemetry data including first telemetry data provided by a first one of the components to indicate utilization of the first one of the components, and second telemetry data provided by a second one of the components to indicate utilization of the second one of the components;

concatenate the respective component certificates and a the respective telemetry data provided by the respective ones of the components; and generate an appliance certificate over the concatenation, the appliance certificate to be used, at least in part, to assign a workload to the edge appliance device.

16. The one or more computer-readable storage devices of claim 15, wherein at least one of the one or more processors is an accelerator, and the accelerator is to generate the appliance certificate.

17. The one or more computer-readable storage devices of claim 15, wherein the first telemetry data is certified by the first one of the components based on a first key associated with the first one of the components, and the second telemetry data is certified by the second one of the respective components based on a second key associated with the second one of the components.

18. The one or more computer-readable storage devices of claim 15, wherein the respective component certificates indicate a hardware configuration and a firmware configuration of the respective components.

19. The one or more computer-readable storage devices of claim 15, wherein at least some of the components of the edge appliance device are disaggregated components, and at least some of the disaggregated components are remote from other components of the edge appliance device.

20. The one or more computer-readable storage devices of claim 15, wherein the respective component certificates are stored in one or more storage devices for access by a relying party.

21. A virtualized system for edge appliance orchestration, the virtualized system comprising:

an aggregated attestation manager to (i) verify an appliance certificate of an edge appliance device, the appliance certificate being a concatenation of respective component certificates and respective telemetry data provided by respective components of the edge appliance device, the respective component certificates to indicate respective configurations of the respective components of the edge appliance device, the respective telemetry data to indicate respective utilizations reported by the respective components and (ii) compare the respective configurations and respective utilizations indicated by the appliance certificate to a service level agreement requirement associated with a workload; and a workload orchestrator to schedule the workload to the edge appliance device when the comparison performed by the aggregated attestation manager indicates the edge appliance device satisfies the service level agreement requirement, at least one of the aggregated attestation manager or the workload orchestrator implemented by at least one of hardware or at least one processor.

22. The virtualized system of claim 21, wherein the aggregated attestation manager is to verify the appliance certificate based, at least in part, on a comparison of the appliance certificate to an expected certificate.

23. The virtualized system of claim 21, wherein the aggregated attestation manager is to determine whether the edge appliance device satisfies the service level agreement requirement based on an evaluation of a security property of a trusted execution environment.

24. The virtualized system of claim 21, wherein at least some of the components of the edge appliance device are disaggregated components, and at least some of the disaggregated components are remote from other components of the edge appliance device.

25. The virtualized system of claim 21, wherein the aggregated attestation manager accesses the appliance certificate in a storage device of the edge appliance device.

26. An edge appliance device to perform a workload, the edge appliance device comprising:
memory;
programmable circuitry; and
instructions to cause the programmable circuitry to:
obtain respective component certificates and respective telemetry data from respective ones of a plurality of components of the edge appliance device, the respective component certificates provided by the respective ones of the components to attest to respective configurations and respective identities of the respective ones of the components, the respective telemetry data including first telemetry data provided by a first one of the components to indicate utilization of the first one of the components, and second telemetry data provided by a second one of the components to indicate utilization of the second one of the components;
concatenate the respective component certificates and the respective telemetry data provided by the respective ones of the components; and
generate an appliance certificate over the concatenation, the appliance certificate to attest to the configurations and utilizations of the components of the edge appliance device, and the appliance certificate to be used to determine the workload is to be assigned to the edge appliance device.

27. The edge appliance device of claim 26, wherein the first telemetry data is certified by the first one of the components based on a first key associated with the first one of the components, and the second telemetry data is certified by the second one of the components based on a second key associated with the second one of the components.

28. The edge appliance device of claim 26, wherein at least one of the components includes at least one of an accelerator, a compute platform, a memory component, a storage component, or a functional block of the edge appliance device.

29. The edge appliance device of claim 26, wherein at least one of the components is a disaggregated resource of the edge appliance device.

* * * * *